US012624587B2

(12) United States Patent
Zhang

(10) Patent No.: US 12,624,587 B2
(45) Date of Patent: May 12, 2026

(54) WINDOW OPEN AND CLOSE MECHANISM

(71) Applicant: Long Ten Technology Inc., Mississauga (CA)

(72) Inventor: Min Zhang, Mississauga (CA)

(73) Assignee: Long Ten Technology Inc., Mississauga (CA)

( * ) Notice: Subject to any disclaimer, the term of this patent is extended or adjusted under 35 U.S.C. 154(b) by 0 days.

(21) Appl. No.: 18/425,109

(22) Filed: Jan. 29, 2024

(65) Prior Publication Data

US 2024/0263503 A1 Aug. 8, 2024

(30) Foreign Application Priority Data

Feb. 3, 2023 (CA) ................................ CA 3188624

(51) Int. Cl.
*E05F 11/26* (2006.01)
*E05C 9/00* (2006.01)
*E05C 9/02* (2006.01)

(52) U.S. Cl.
CPC .............. *E05F 11/26* (2013.01); *E05C 9/006* (2013.01); *E05C 9/025* (2013.01); *E05Y 2201/682* (2013.01); *E05Y 2201/708* (2013.01); *E05Y 2900/148* (2013.01)

(58) Field of Classification Search
CPC ... E05F 11/24–28; E05F 11/145; E05F 11/12; E05D 15/44; E05Y 2201/638; E05Y 2201/682; E05Y 2201/708; E05Y 2900/148; E05Y 2800/296; E05C 9/025; E05C 9/006
USPC .................................................... 49/339–340
See application file for complete search history.

(56) References Cited

U.S. PATENT DOCUMENTS 2,709,582 A * 5/1955 Chapman ................ E05D 15/44
49/81.1
6,431,620 B2 * 8/2002 Tremblay ................ E05D 15/44
292/DIG. 20
6,442,898 B1 * 9/2002 Wu ......................... E05D 15/44
49/246
7,004,515 B2 * 2/2006 Timothy ................. E05C 9/185
292/141

(Continued)

FOREIGN PATENT DOCUMENTS

CA 2908303 A1 10/2014
CH 410666 A * 3/1966 .............. E05F 11/24

(Continued)

*Primary Examiner* — Catherine A Kelly
*Assistant Examiner* — Patrick B. Ponciano
(74) *Attorney, Agent, or Firm* — Lei Gao

(57) ABSTRACT

A mechanism for a covering such as an encasement window or door or awning is provided. The mechanism includes an arm, on which a slot is configured. The slot includes a straight section and an angled section. The arm also includes a hole that is offset from the centerline of the straight section and disposed between the angled section and an end of the arm. A pin shaft is disposed in the hole and held in place by a cover member and a movable member, enabling the arm to rotate about the pin shaft. A rivet pin is disposed in the slot and fixedly connected to a fixed member. When the movable member moves, the arm moves such that the hung sash is unlocked from the fixed frame of the covering, and the angled section engages the rivet pin, causing the arm to rotate to open the covering.

18 Claims, 8 Drawing Sheets

(56) References Cited

U.S. PATENT DOCUMENTS

| | | | | |
|---|---|---|---|---|
| 7,708,322 | B2 * | 5/2010 | Timothy | E05C 9/063 292/DIG. 20 |
| 9,512,658 | B2 * | 12/2016 | Balbo Di Vinadio | E05F 11/28 |
| 9,518,416 | B2 * | 12/2016 | Pacini | E06B 3/36 |
| 9,797,176 | B2 * | 10/2017 | Balbo Di Vinadio | E05F 11/34 |
| 11,060,336 | B2 * | 7/2021 | Mcgregor | E05D 15/466 |
| 11,480,001 | B2 * | 10/2022 | Erickson | E06B 3/325 |
| 12,421,778 | B2 * | 9/2025 | Douglas | E05D 11/0081 |
| 2001/0019211 | A1 * | 9/2001 | Tremblay | E05C 9/185 292/70 |
| 2025/0003275 | A1 * | 1/2025 | Halecki | E05F 11/16 |

FOREIGN PATENT DOCUMENTS

| | | | | |
|---|---|---|---|---|
| CN | 119411898 | A * | 2/2025 | E05B 65/00 |
| EP | 1710379 | A1 * | 10/2006 | E05F 11/24 |
| EP | 2116680 | A1 * | 11/2009 | E05F 15/40 |
| EP | 3059367 | A1 * | 8/2016 | E05F 11/24 |
| GB | 2559782 | A * | 8/2018 | E05C 9/041 |
| IT | TO20130738 | A1 * | 3/2015 | |
| KR | 102044162 | B1 * | 5/2019 | E06B 3/2605 |
| WO | WO-2025012015 | A1 * | 1/2025 | E05F 11/145 |

* cited by examiner

WINDOW OPEN AND CLOSE MECHANISM

CROSS-REFERENCES

This application claims priority of Canadian patent application No. 3188624, filed on Feb. 3, 2023, the contents of which is incorporated herein by reference in their entirety

TECHNICAL FIELD

This disclosure relates to a covering for openings of buildings in general. In particular, it relates a mechanism for opening the covering such as windows and doors for the openings.

BACKGROUND

Casement or awning windows or doors are commonly used for allowing airflow while preventing insects and such from entering the building by using nets. For example, a net is installed on a fixed frame, while glass is installed on a movable hung sash. When opening the covering, the hung sash is moved away from the fixed frame, allowing airflow, while the net prevents insects and such from entering the building.

As such, there is a need for a mechanism that enables opening the hung sash in a controlled manner. It is also desirable for the mechanism to lock the hung sash in the fully open position such that the hung sash does not close suddenly, for example, because of wind gusts.

SUMMARY

A mechanism for opening and closing a covering for a building, such as a casement or awning windows or doors, is provided. The mechanism includes an arm, which includes a slot. The slot includes a straight section that is substantially parallel to the length of the arm and an angled section. The angle between the angled section and the straight section is larger than 0 and smaller than 90 degrees, preferably between 20-70 degrees, more preferably between 30-60 degrees, and most preferably 45 degrees.

The arm includes a hole that is offset from the centerline of the straight section and is disposed between the angled section and an end of the arm distal from the straight section.

The mechanism also includes a rivet pin that is at least partially disposed in the slot and is slidable in the slot. The rivet pin is received in a fixed element that is fixedly attached to a fixed frame.

The mechanism further includes a movable element that receives a part of a pin shaft in a receptacle. The movable element includes a channel that is offset from the receptacle and the rivet pin passes through the channel to be received in the fixed element.

The pin shaft has an enlarged portion that comprises a spheroidal surface that is received in the hole of the arm, and the hole defines a spheroidal inner surface. As such, the pin shaft and the hole cooperate to allow a spheroid joint like connection.

A cover member is included in the mechanism, which includes a recess that receives a portion of the pin shaft and a groove that receives a head of the rivet pin and allow the rivet pin to move in the groove.

The fixed element comprises a projection that is configured to be at least partially received in the channel, and the rivet pin is received in the projection.

The mechanism further includes a rod that is movably attached to the fixed frame that is a part of an encasement covering, which also includes a hung sash that is openable from the fixed frame. The rod includes a projection and the hung sash includes a retainer member, and the projection and the retainer member cooperate to prevent the hung sash from opening from the fixed frame.

The rod is operatively connected to a handle. When the handle is rotated, the rod moves along the fixed frame.

The movement of the rod comprises a first portion in which the straight section slides about the rivet pin and the projection disengages from the retainer member such that the hung sash is allowed to be opened, and a second portion in which the angled section engages the rivet pin, causing the arm to rotate about the pin shaft.

A slider is configured on an end of the arm that is distal from the slot, and the slider is configured to be installed on the hung sash. When the arm rotates, the slider slides along a frame of the hung sash.

When the hung sash is fully open, the arm is in a locked position, and is substantially perpendicular to a side of the fixed frame and a side of the hung sash.

BRIEF DESCRIPTION OF THE DRAWINGS

The disclosure will be explained in more detail in the following with reference to embodiments and to the drawing in which are shown.

DESCRIPTION

In the following description, numerous specific details are set forth in order to provide a more thorough description of the present disclosure. It will be apparent, however, to one skilled in the art, that the present disclosure may be practiced without these specific details. Other embodiments of the disclosure will readily suggest themselves to such skilled persons having the benefit of this disclosure. In some instances, well-known features have not been described in detail so as not to obscure the disclosure.

As used herein, the following terms and variations thereof have the meanings given below, unless a different meaning is clearly intended by the contest in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

The term "connected," "attached to" or similar expression may indicate that the elements are directly connected to each other or connected through other components.

Figure 1:
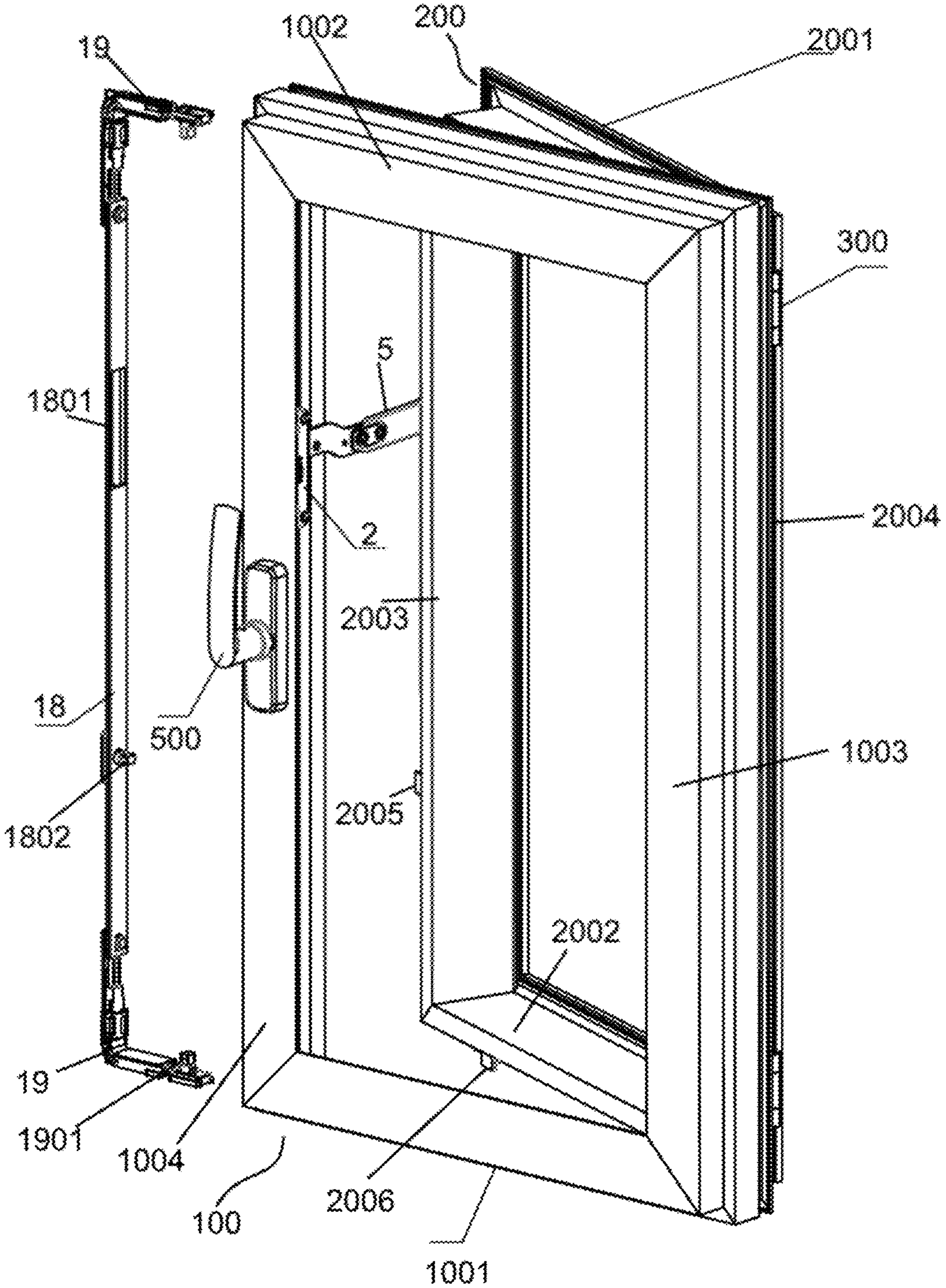
FIG. 1 shows a perspective and isolated view of a casement window in the open position that incorporates one embodiment of the mechanism of this disclosure.
Figure 2:
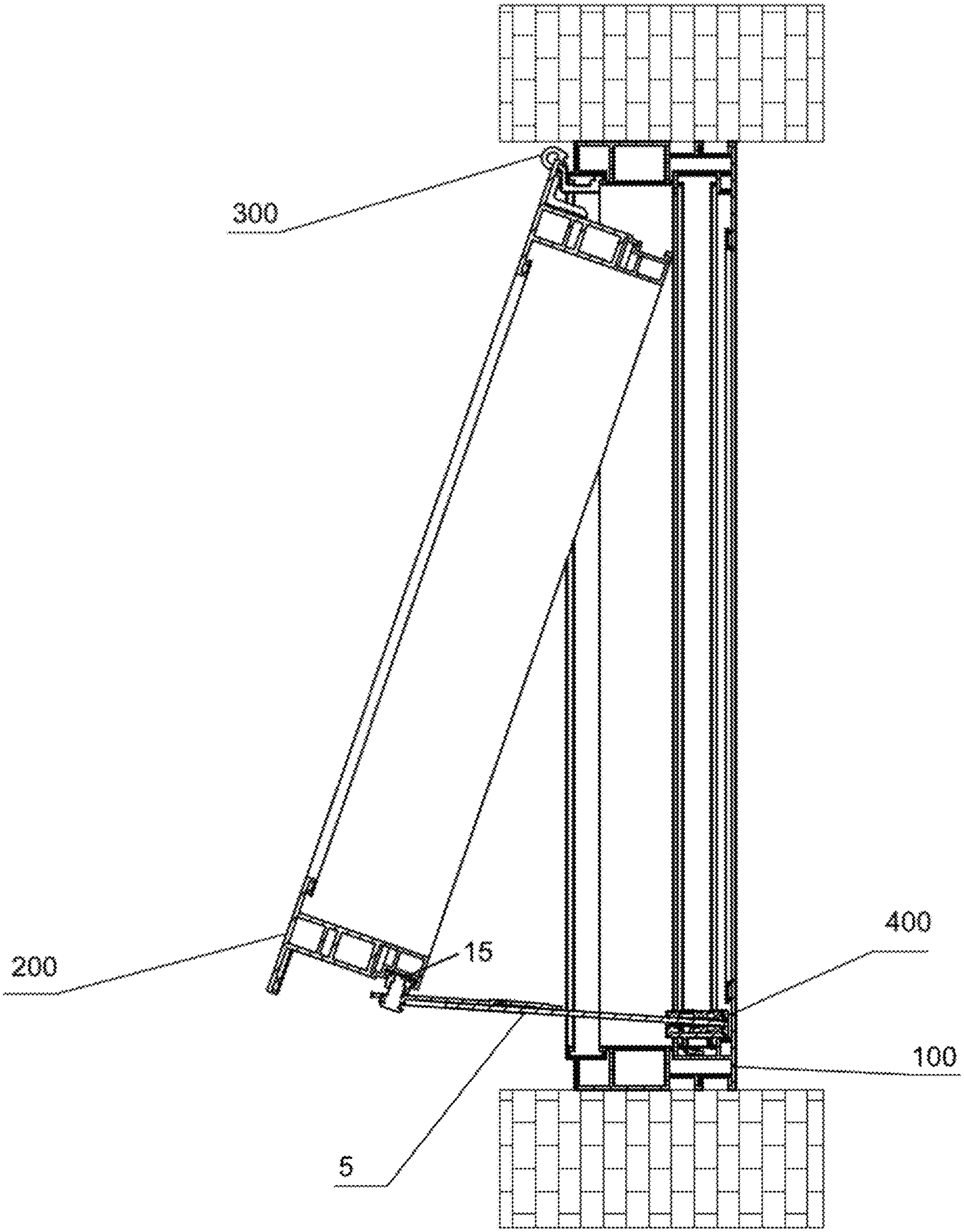
FIG. 2 shows a top view of a window that is installed in an opening in a building while in the open position.

Referring to FIGS. 1 and 2, which show an example casement window in the open position. The arm 5 pushes the hung sash 200 away from the fixed frame 100.

The casing of the disclosure includes a fixed frame 100 adapted to be mounted in an opening formed in a wall to which a hung sash 200 is pivotally connected by means of hinges 300. The hinges 3 allow the rotation of the hung sash 200 about an axis defined by the hinges 300 when the casing is in use.

In particular, the fixed frame 100 is constructed by hollow profiles mounted to form a rectangular framework, with two horizontal sides 1001, 1002 and two vertical uprights 1003 and 1004. The hollow profiles may be constructed from aluminum, steel, wood, or plastic, etc.

The hung sash 200 is constructed with two horizontal crosspieces 2001, 2002, and two vertical uprights 2003 and 2004. The hinges 300 are attached to the vertical uprights 1003 and 2004.

A handle 500 is installed on the surface of the upright 1004 away from the hung sash 200.

A rod 18 is installed on the vertical upright 1004 by connectors 19. The rod 18 is operatively connected with the handle 500. When the handle 500 is rotated, the rod 18 moves along the vertical upright 1004.

Retainer members 2005 and 2006 are configured on the hung sash 200. Corresponding projections 1802 and 1901 are configured on the rod 18 and the connector 19. When the retainer members 2005 and 2006 engages the corresponding projections 1802 and 1901, the hung sash 200 is locked to the fixed frame 100 such that the hung sash 200 cannot be opened.

When the rod 18 is moved, the projections 1802 and 1901 moves such that they disengage from the retainer members 2005 and 2006, allowing the hung sash 200 to be opened.

The arm 5 is in a locked position and is substantially perpendicular to the upright 1004 and 2003, and the hung sash 200 is in a locked position such that wind will not cause the hung sash 200 to close.

Figure 3:
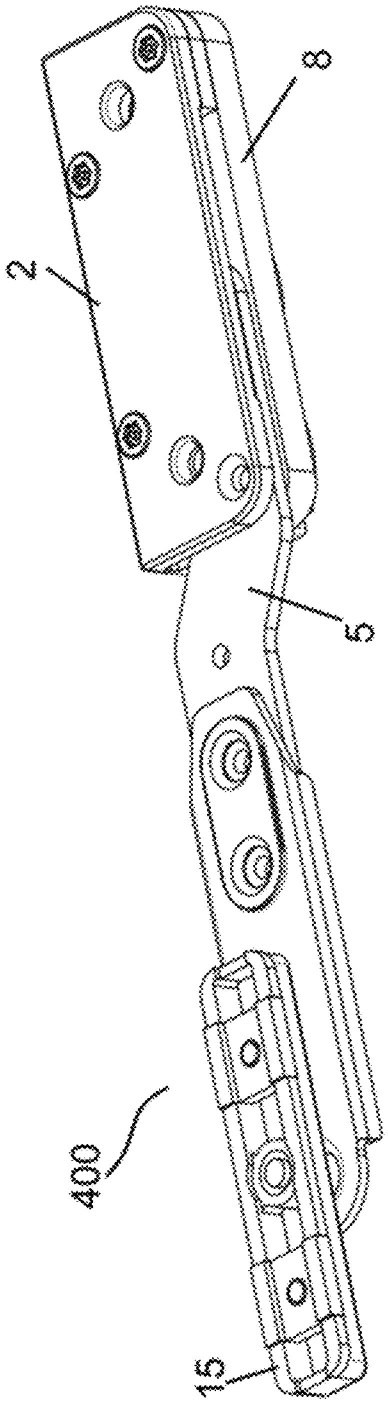
FIG. 3 shows a perspective view of one embodiment of the assembled mechanism.
Figure 4:
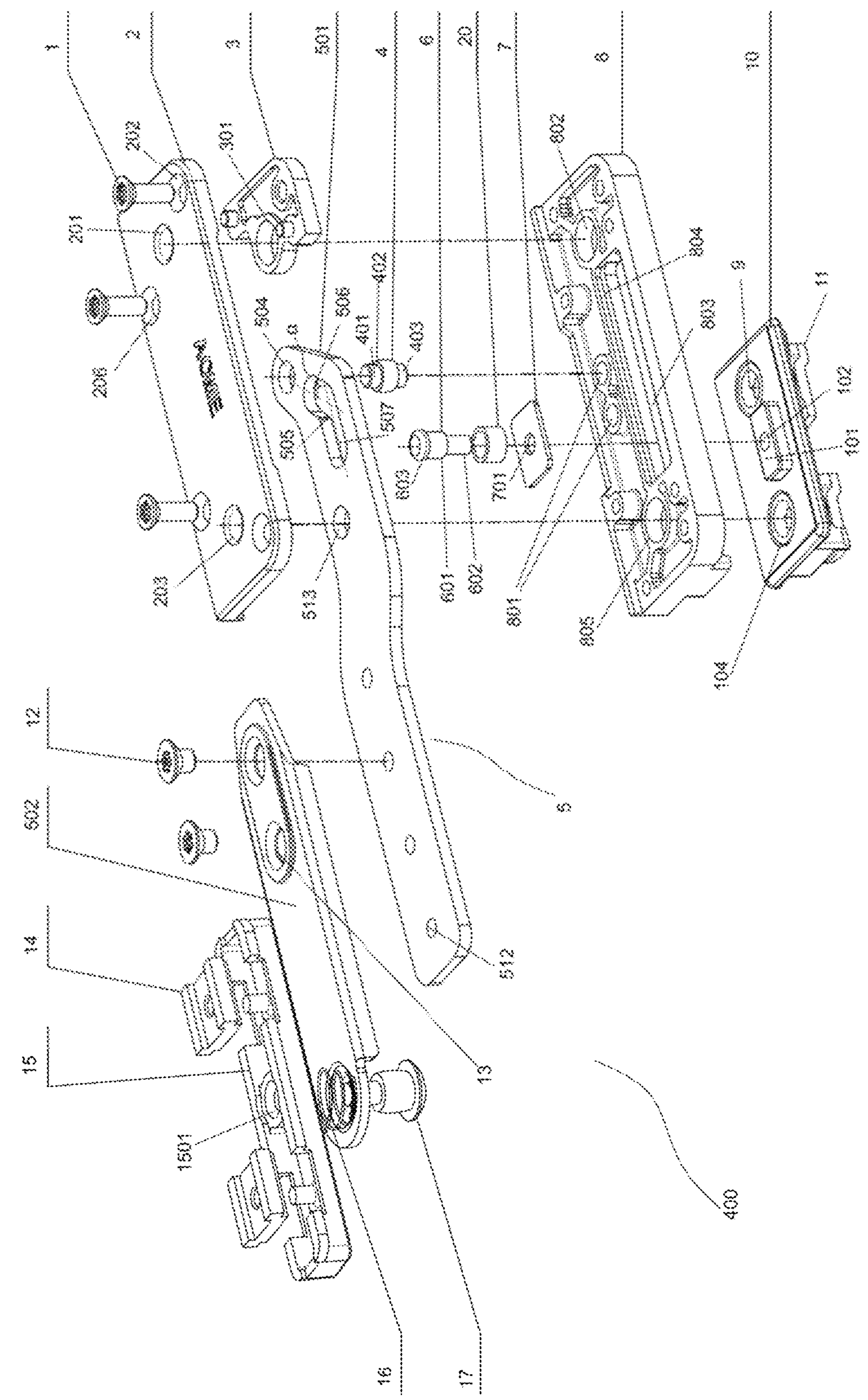
FIG. 4 shows an exploded view of the mechanism of FIG. 3 when the mechanism is in the closed position.
Figure 5:
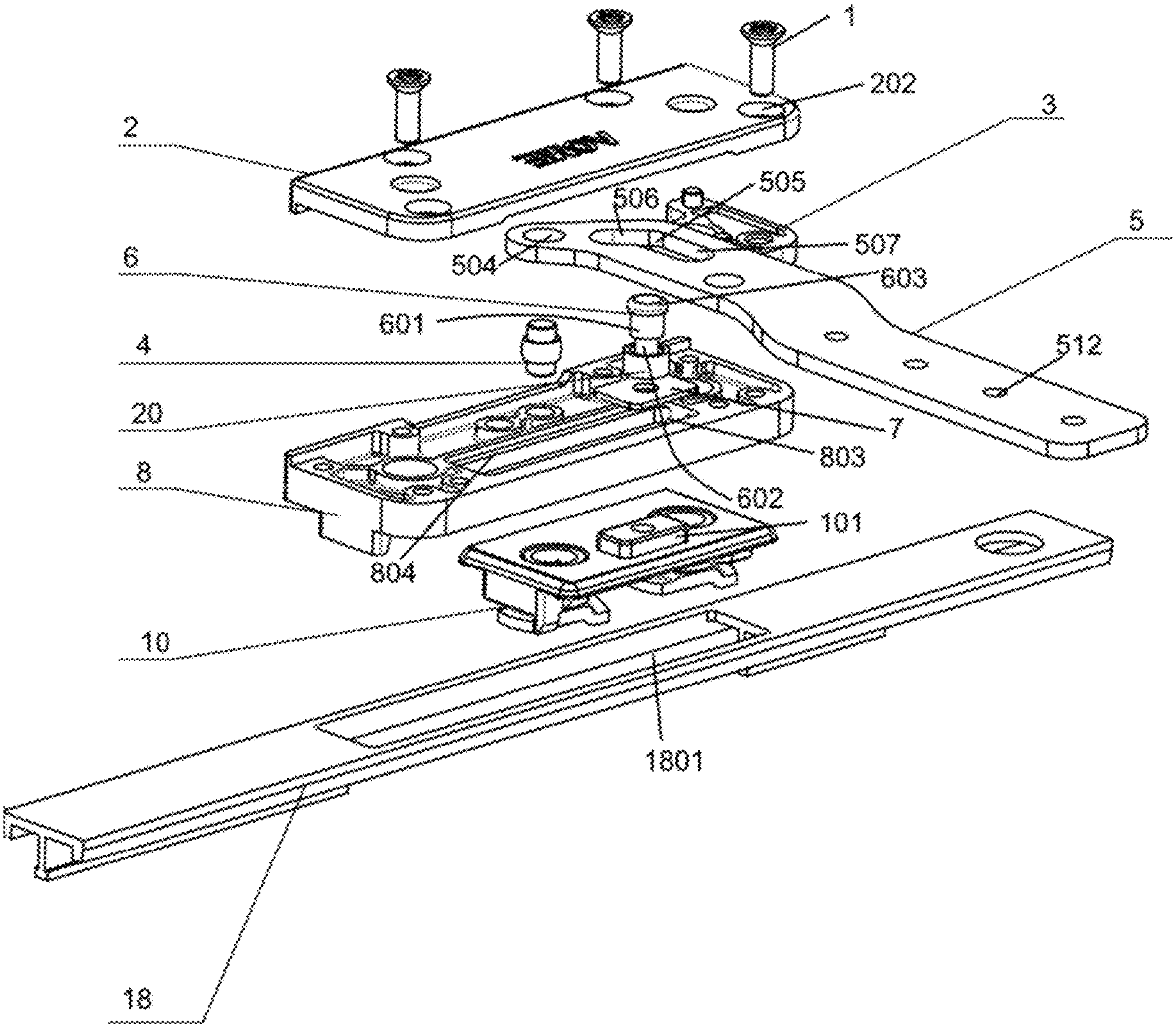
FIG. 5 shows an exploded view of the mechanism of FIG. 3 when the mechanism is in the open position, together with a rod.
Figure 6:
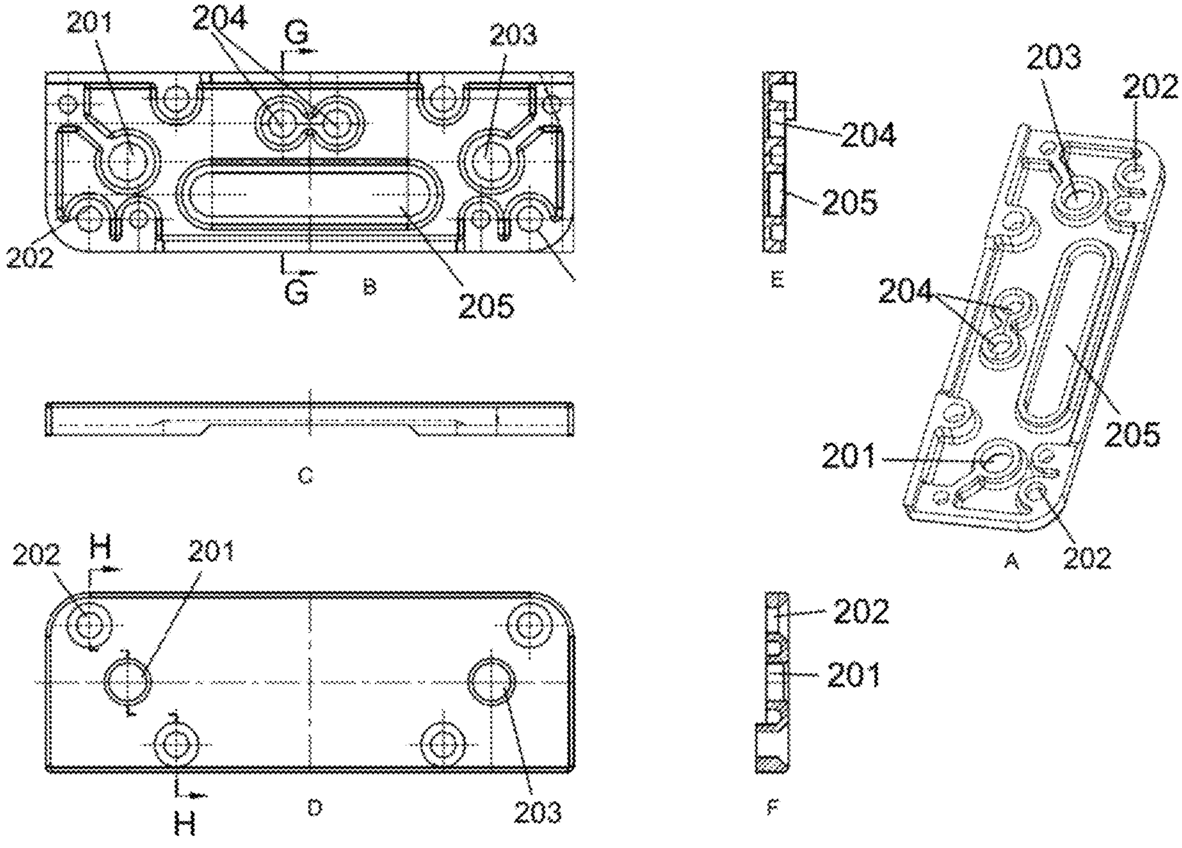
FIG. 6A shows a perspective view of the underside of one embodiment of the cover member.
FIG. 6B shows the bottom view of the cover member of FIG. 6A.
FIG. 6C shows a side view of the cover member of FIG. 6A.
FIG. 6D shows a top view of the cover member of FIG. 6A
FIG. 6E shows a sectional view along the line G-G.
FIG. 6F shows a sectional view along the line H-H.

Referring to FIG. 3, FIG. 4, and FIG. 5, which show one embodiment of the mechanism.

The mechanism 400 is configured to be attached to the fixed frame 100 of a casement covering at one end and the hung sash 200 at the other end.

The mechanism 400 includes a slider 15 that is configured to be slidably installed on the hung sash 200. The slider 15 includes damping blocks 14 that are configured to be slidably inserted in a groove-type structure in the hung sash 200 such that slider 15 can slide along the groove, such as in the vertical upright 2003 of the hung sash 200.

The mechanism 400 includes an arm 5, which includes a first part 501 and a second part 502.

The first part 501 includes a slot 505, which includes a straight section 507 that is substantially parallel to the length of the arm 5 and an angled section 506. The angle $\alpha$ between the centerline of section 506 and the centerline of the straight section 507 is larger than 0 and smaller than 90 degrees, preferably between 20-70 degrees, more preferably between 30-60 degrees, and most preferably 45 degrees. The angled section 507 is farther away from the second part 502 than the straight section 507.

A hole 504 is disposed between the angled section 506 of the slot 505 and the end of the first part 501 distal from the second part 502 and the straight section 507. The centre of the hole 504 is offset from the centreline of the straight section 507. In some embodiments, the centre of the hole 504 is disposed on the centreline of the angled section 506.

The second part 502 is connected to the slider 15 by a connecter 17 through the hole 1501, and the connector 17 may be a screw or a rivet. A spring 16 is disposed between the second part 502 and the slider 15 to allow some flexibility between the second part 502 and slider 15. This flexibility allows the slider 15 to move so that it is not always parallel to the arm 5, such as shown in FIG. 2.

The first part 501 and the second part 502 are connected by the connectors 12 through the connection plate 13. The connectors 12 may be screws or rivets.

The first part 501 includes holes 512 that allows the adjustment of the length of the arm 5 by connecting the first part 501 and the second part 502 through different hole 512. In some embodiments, the first part 501 and the second part 502 are integrally formed in a unitary structure and the arm 5 of different lengths may be provided for different situations.

The mechanism 400 also includes a pin shaft 4. The pin shaft 4 includes a stem 401 and a stem 403. An enlarged portion 402 with a spheroidal outside surface is configured between the stems 401 and 403. This enlarged portion 402 is configured to be disposed in the hole 504, which 10 has a spheroidal inner surface that cooperates with the enlarged portion 402 of the pin shaft 4 such that spheroid joint like movement is allowed between this enlarged portion 403 and the inner surface of the hole 504. The arm 5 is rotatable about the enlarged portion 402.

The mechanism 400 also includes a movable element 8. A channel 803 is configured in the movable element 8. The channel 803 is substantially parallel to the length of the movable element 8. Rib 804 is configured inside the channel 803. When the mechanism 400 is assembled, the channel 803 is substantially aligned with the straight section 507 of the slot 505 when the assembled mechanism 400 is in the closed position.

The movable element 8 is disposed in the aperture 1801 of the rod 18. As such, the movement of the rod 18 causes the movable element 8 to move.

The movable element 8 also includes two receptacles 801 that are disposed between the channel 803 and a longitudinal edge of the movable element 8. The receptacles 801 are offset from the channel 803. In other words, the receptacles 801 are not disposed along, or offset from, the centre longitudinal line of the channel 803. The receptacles 801 are configured to receive the stem 403 so that the stem 403 is rotatable within the receptacle 801. Different receptacle 801 is used depending on whether the hung sash 200 is opened from the left- or right-hand side.

A platen 7 is disposed on the rib 804 inside the channel 803. The platen 7 is sized and shaped to rest on the rib 804. The platen 7 includes a hole 701.

The mechanism 400 also includes a fixed element 10, which includes holes 104. Connectors 9 connects the platens 11 to the fixed element 10.

The fixed element 10 is adapted to attach to the upright 1004 of the fixed frame 100. Each platen 11 has one dimension that is larger than another dimension. During installation, the platens 11 are disposed in a groove in the window frame of the fixed frame 100, then the platens 11 are rotated to engage the groove. The connectors 9 are then tightened such that the fixed element 10 is fixedly connected to the fixed frame 100.

The fixed element includes a parallelepiped-shaped projection 101. The projection 101 is configured to be received in the channel 803 so that the projection 101 slidably engages with the movable element 8. The projection 101 includes a receptacle 102 that is configure to receive the stem 602.

The mechanism 400 includes a rivet pin 6, which includes a neck 601 and a stem 602. A part of the rivet pin 6, for example, the neck 601 or the stem 602, is disposed in the slot 505. The rivet pin 6 is configured to slidably engage the slot 505. The rivet pin 6 includes an enlarged head 603 such that the rivet pin 6 cannot move through the slot 505 after installation.

In some embodiments, a sleeve 20 is provided about the rivet pin 6 to facilitate the movement of slot 505 relative to the rivet pin 6.

The stem 602 enters the channel 803, and passes through in the hole 701, and received in the projection 101 of the fixed element 10. The fixed element 10 may be fixed at different locations to allow for flexibility during installation.

A cover member 2 is mounted on top of the arm 5. A block 3 is disposed between the cover member 2 and the movable element 8 such that a space is maintained between the cover member 2 and the movable element 8.

The block 3 includes an aperture 301 that is alignable with the hole 201 on the cover member 2, which is in turn alignable with the hole 802 on the movable element 8. Thus, the connecter 9 can be accessed. Likewise, the apertures 203, 513 and 805 are alignable to allow access to the other connector 9.

The connectors 1 connects the cover member 2 to the block 3 and the moving member 8 through the hole 202. A such, the cover member 2, the block 3, and the moving member 8 move together.

Referring now to FIGS. 6A-F, which shows various views of the cover member 2.

The cover member 2 includes a straight groove 205 that corresponds to the channel 803. The groove 205 is configured to receive the head 603 of the rivet pin 6. The groove 205 and the channel 803 cooperate such that the movement of the moveable member 8 relative to the rivet pin 6 is limited to be linear.

The cover member 2 also incudes two receptacles 204 that corresponds to the receptacles 801. The receptacles 204 are configured to receive the stem 401. Cooperating with the respective receptacle 801, different receptacles 204 allow the mechanism to function whether the hung sash 200 is open from the left- or the right-hand side. After assembly, the pin shaft 4 is fixed between the movable member 8 and the cover member 2 so that the enlarged portion 402 does not disengage from the hole 504.

Figure 7A:
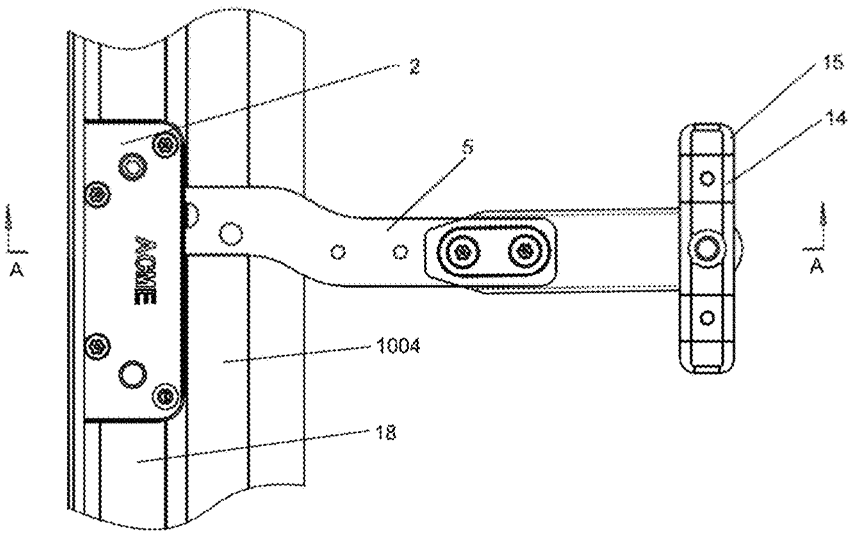
FIG. 7A shows the enlarged side view of the window in the open position showing the mechanism at work.
Figure 7B:
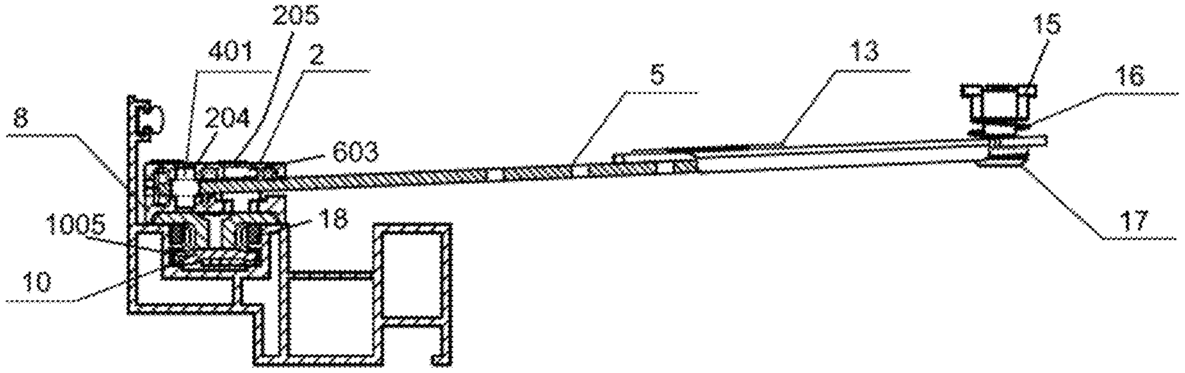
FIG. 7B shows a cross-section view of FIG. 7A along the A-A line.

FIGS. 7A and 7B show the window in the open position, i.e., the hung sash 200 is opened.

The arm 5 is in the fully open position. The head 603 of the rivet pin 6 is received in the groove 205 of the cover member 2. The stem 401 of the pin shaft 4 is received in the receptacle 204 of the cover member 2.

The fixed element 10 engages the ridge 1005 of the fixed frame 100.

The movable member 8 is partially disposed in the rod 18.

Because of the spheroid joint like connection between the pin shaft 4 and the hole 504, the arm is allowed to be at an angle relative to the longitudinal axis of the pin shaft 4.

The spheroid joint like connection also allows the arm 5 to deviate from being perpendicular to the surfaces defined by the fixed frame 100 and the hung sash 200.

Figure 8:
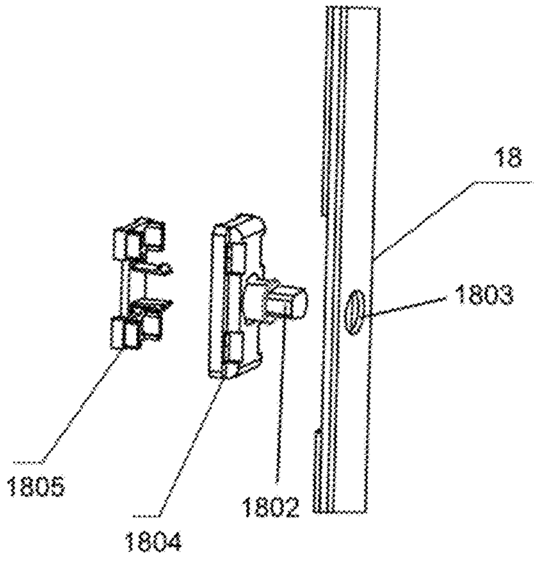
FIG. 8 shows the exploded view of one embodiment rod and the projection thereon.

Reference is now made to FIG. 8.

The projection 1802 is configured on a block 1804. The projection 1802 is configured to pass through the opening 1803 of the rod 18 and protrudes therefrom. The retainer 1805 retains the block 1804 to the rod 18. In some embodiments, the projection 1802 is integrally formed on the rod 18 in a unitary structure.

Figure 9:
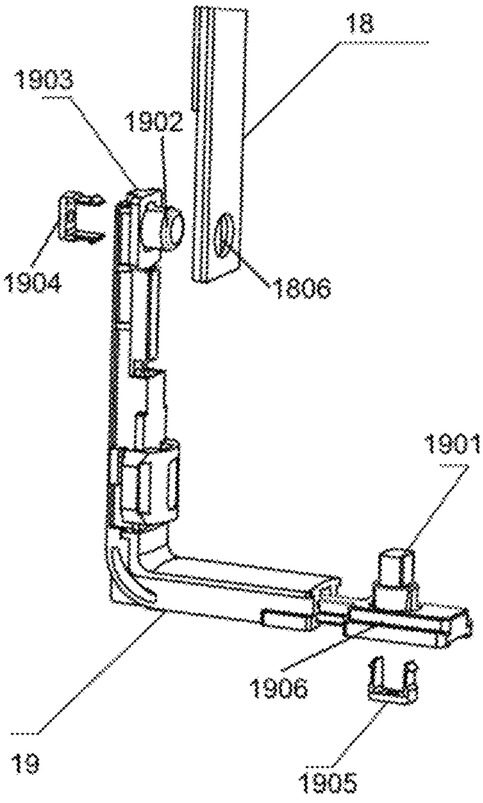
FIG. 9 shows the exploded view of one embodiment of the connector of the rod to the frame.

Reference is now made to FIG. 9.

The connector 19 includes a block 1903, on which a projection 1902 is configured. The projection 1902 is configured to pass through the opening 1806. The retainer 1904 attaches the block 1903 to the rod 18 such that the block 1903 moves with the rod 18.

The projection 1901 is configured on a block 1906. The block 1906 is operatively connected to the block 1903, when the block 1903 moves, the block 1906 also moves.

When a user is trying to open the hung sash 200, the handle 500 is rotated, causing the rod 18 to move along the vertical upright 1004. The projections 1802 and 1901 disengages from the retainer members 2005 and 2006, thus allowing the hung sash 200 to be opened from the fixed frame 100. Meanwhile, aperture 1801 pushes the movable element 8 to move. The pin shaft 4 moves along with the movable element 8, causing the arm 5 to move, during which the straight section 507 of the slot 505 to slidably move relative to the rivet pin 6.

When the rod 18 is moved further, the angled section 506 engages the rivet pin 6. The angled section 506 slides along the rivet pin 6 while also engages the rivet pin 6 such a force is imparted on the angled section 506, causing the arm 5 to rotate about the pin shaft 4. With further movement of the rod 18, the arm 5 continue to rotate until the hung sash 200 is fully open, for example, as shown in FIG. 2. At this position, the hung sash 200 is in a locked position such that the hung sash 200 will not close because of environmental forces such as wind. In the locked position, the arm 5 is substantially perpendicular to the vertical uprights 2003 and 1004.

When a user closes the hung sash 200, the handle 500 is rotated, causing the rod 18 to move lengthwise in the reverse direction as discussed above. The engagement between the rivet pin 6 and the angled section 506 causes the arm 5 to rotate about the pin shaft 4, such that the hung sash 200 is closed. After the hung sash 200 is closed, the straight section 507 slides with respect to rivet pin 6, and the projections 1802 and 1901 engage the retainer elements 2005 and 2006 such that the hung sash 200 is locked to the fixed frame 100.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A mechanism, comprising:

an arm comprising a slot, the slot comprising a straight section that is substantially parallel to a length of the arm and an angled section that is at an angle relative to the length of the arm, a hole disposed between an end of the slot and an end of the arm distal from the straight section, and a centre of the hole is offset from a centreline of the straight section;

a rivet pin, at least partially disposed in the slot, the slot is slidable relative to the rivet pin, and the rivet pin is engageable with the angled section; and a pin shaft, at least partially disposed in the hole, such that the arm is rotatable about the pin shaft;

a movable element that includes a receptacle configured to receive a first portion of the pin shaft such that the pin shaft moves with the movable element, the movable element comprises a channel that is offset from the receptacle, and the rivet pin passes through the channel to be received in a fixed element;

wherein a distance between the rivet pin and the pin shaft remains constant in a direction perpendicular to a length of the channel in a plane defined by the receptacle and the channel and the rivet pin is stationary whether the arm moves or is stationary.

2. The mechanism of claim 1, wherein the fixed element is configured to fixedly attach to a fixed frame.

3. The mechanism of claim 2, wherein the fixed element comprises a projection that is configured to be at least partially received in the channel, and the rivet pin is received in the projection.

4. The mechanism of claim 2, further comprising a rod, which comprises an aperture that is configured to receive the movable element.

5. The mechanism of claim 4, wherein the rod is configured to be movably attached to the fixed frame.

6. The mechanism of claim 5, further comprising a hung sash that is connected to the fixed frame by a hinge, allowing the hung sash to rotate about the hinge, wherein the rod comprises a projection;

the hung sash comprises a retainer member; and the projection and the retainer member are engageable to prevent the hung sash from rotating away from the fixed frame.

7. The mechanism of claim 6, wherein a handle is disposed on the fixed frame, and the handle is operatively connected to the rod, such that a rotation of the handle causes the rod to move along the fixed frame.

8. The mechanism of claim 7, wherein a movement of the rod comprises a first portion wherein the straight section slides about the rivet pin and causes the projection to disengage from the retainer member, and a second portion wherein the angled section engages the rivet pin such that the arm rotates about the pin shaft.

9. The mechanism of claim 8, further comprising a slider disposed at one end of the arm distal from the slot, the slider is configured to be installed on the hung sash, and the slider is slidable with respect to an upright of the hung sash when the arm rotates.

10. The mechanism of claim 9, wherein when the hung sash is fully open, the arm is in a locked position.

11. The mechanism of claim 10, wherein the arm is substantially perpendicular to a side of the fixed frame and a side of the hung sash in the locked position.

12. The mechanism of claim 1, further comprising a cover member that comprises a groove that a head of the rivet pin is movably received therein, and a receptacle that is configured to receive a second portion of the pin shaft.

13. The mechanism of claim 1, wherein the pin shaft comprises an enlarged portion that comprises a spheroidal surface that is received in the hole, and the hole defines a spheroidal inner surface, wherein the spheroidal surface and the spheroidal inner surface cooperate to allow a spheroid joint like connection.

14. The mechanism of claim 1, wherein the angle is larger than 0 degrees and smaller than 90 degrees.

15. The mechanism of claim 14, wherein the angle is between 20 and 70 degrees.

16. The mechanism of claim 15, wherein the angle is 45 degrees.

17. A covering for an opening in a building, the covering comprising the mechanism of claim 1.

18. The covering of claim 17, wherein the covering is a window or a door.

* * * * *